United States Patent
Worrall

(10) Patent No.: US 10,588,066 B2
(45) Date of Patent: Mar. 10, 2020

(54) TRAFFIC OFFLOAD

(71) Applicant: Alcatel Lucent, Boulogne Billancourt (FR)

(72) Inventor: Chandrika K. Worrall, Swindon (GB)

(73) Assignee: Alcatel Lucent, Nozay (FR)

( * ) Notice: Subject to any disclaimer, the term of this patent is extended or adjusted under 35 U.S.C. 154(b) by 164 days.

(21) Appl. No.: 14/761,479

(22) PCT Filed: Dec. 19, 2013

(86) PCT No.: PCT/EP2013/003847
§ 371 (c)(1),
(2) Date: Jul. 16, 2015

(87) PCT Pub. No.: WO2014/111116
PCT Pub. Date: Jul. 24, 2014

(65) Prior Publication Data
US 2015/0365867 A1     Dec. 17, 2015

(30) Foreign Application Priority Data

Jan. 16, 2013   (EP) .................................... 13305045

(51) Int. Cl.
*H04L 12/26* (2006.01)
*H04W 36/22* (2009.01)
(Continued)

(52) U.S. Cl.
CPC ......... *H04W 36/22* (2013.01); *H04W 12/001* (2019.01); *H04W 12/04* (2013.01);
(Continued)

(58) Field of Classification Search
CPC . H04W 48/10; H04W 72/04; H04W 72/0473; H04W 84/045; H04W 92/20;
(Continued)

(56) References Cited

U.S. PATENT DOCUMENTS 8,787,909 B2 * 7/2014 Kim ...................... H04W 8/082
370/328
2006/0072758 A1   6/2006 Farnsworth et al.
(Continued)

FOREIGN PATENT DOCUMENTS

JP    2012-178822    9/2012
JP    2013-502182    1/2013
(Continued)

OTHER PUBLICATIONS

John L. Tomici et al., "Multi-RAT Traffic Offloading Solutions for the Bandwidth Crunch Problem," Systems, Applications and Technology Conference, IEEE, pp. 1-6, XP031880722, May 6, 2011.
(Continued)

*Primary Examiner* — Phuoc H Doan
(74) *Attorney, Agent, or Firm* — Fay Sharpe LLP

(57) ABSTRACT

A wireless telecommunications method, network nodes and a computer program product are disclosed. The wireless telecommunications method comprises: mapping at least some user plane traffic only from a first transmission path supporting communications between user equipment and a first base station to a second transmission path supporting simultaneous communications between the user equipment and a second base station; providing data protection configuration information used to encode the at least some user plane traffic transmitted over the second transmission path between the user equipment and the second base station; and transmitting the at least some user plane traffic encoded using the data protection configuration information over the second transmission path. In this way, at least some of the user plane traffic may be offloaded from a first transmission path to a second transmission path. That user plane traffic may be transmitted simultaneously with other user plane traffic. Accordingly, traffic can be directed to different network nodes at the same time and encoded using different (Continued)

data protection configuration information which allows separate schedulers to be used to enable simultaneous transmission to occur even with a non-ideal backhaul link between the two base stations.

11 Claims, 4 Drawing Sheets

(51) Int. Cl.

| | | |
|---|---|---|
| *H04W 28/08* | (2009.01) | |
| *H04W 76/15* | (2018.01) | |
| *H04W 12/00* | (2009.01) | |
| *H04W 12/04* | (2009.01) | |
| *H04W 36/00* | (2009.01) | |
| *H04L 29/06* | (2006.01) | |

(52) U.S. Cl.
CPC ..... *H04W 28/085* (2013.01); *H04W 36/0027* (2013.01); *H04W 36/0038* (2013.01); *H04W 76/15* (2018.02); *H04L 63/0457* (2013.01)

(58) Field of Classification Search
CPC ... H04W 28/048; H04W 36/22; H04W 76/15; H04W 12/04; H04W 36/0038; H04W 36/0027; H04W 12/02; H04W 28/085; H04W 4/40; H04L 63/0457; H04L 29/08864; H04L 9/0861; H04L 63/20; H04L 63/166; H04L 69/16; H04L 63/1433; H04L 63/1441; H04L 63/1408
USPC .......................................... 370/230.1; 455/410
See application file for complete search history.

(56) References Cited

U.S. PATENT DOCUMENTS

| | | | |
|---|---|---|---|
| 2008/0037468 A1* | 2/2008 | Zisimopoulos | H04W 76/002 370/331 |
| 2008/0192925 A1* | 8/2008 | Sachs | H04L 12/5692 380/29 |
| 2011/0255486 A1* | 10/2011 | Luo | H04W 48/12 370/329 |
| 2012/0231824 A1 | 9/2012 | Budic et al. | |
| 2013/0089034 A1* | 4/2013 | Acharya | H04W 48/20 370/329 |
| 2013/0196653 A1* | 8/2013 | Morrison | H04W 28/08 455/426.1 |
| 2013/0223227 A1 | 8/2013 | Lee et al. | |
| 2015/0082393 A1* | 3/2015 | Chen | H04W 84/12 726/4 |
| 2015/0358813 A1* | 12/2015 | Lee | H04W 12/04 380/279 |

FOREIGN PATENT DOCUMENTS

| | | |
|---|---|---|
| KR | 10-2010-0097498 | 9/2010 |
| WO | WO 2011/020062 | 2/2011 |
| WO | WO 2011/046477 A1 | 4/2011 |
| WO | WO 2012/064772 A1 | 5/2012 |
| WO | WO 2013/010005 A1 | 1/2013 |

OTHER PUBLICATIONS

International Search Report for PCT/EP2013/003847 dated Mar. 5, 2014.

* cited by examiner

AN EXAMPLE OF SIGNALLING FLOW FOR PROVISIONING OF PHANTOM CELL INFORMATION TO THE UE

ANOTHER METHOD OF SIGNALLING FLOW FOR PROVISIONING OF PHANTOM CELL SECURITY INFORMATION TO THE UE

DECIPHERING OF DATA FROM MACRO AND PHANTOM CELL AT THE UE

TRAFFIC OFFLOAD

FIELD OF THE INVENTION

The present invention relates to a wireless telecommunications method, network nodes and computer program products.

BACKGROUND

In a cellular wireless telecommunications network, radio coverage is provided by areas known as cells. A base station is located in each cell to provide the radio coverage area or cell. Traditional base stations provide coverage in relatively large geographical areas and these are often referred to as macro cells. It is possible to provide smaller sized cells, often within a macro cell. Such smaller sized cells are sometimes referred to as micro cells, pico cells or femto cells. Such small cells are typically established by providing a small cell base station that provides radio coverage having a relatively limited range, typically within the radio coverage area of a macro cell. The transmission power of the small cell base station is relatively low and, hence, each small cell provides a smaller coverage area compared to that of a macro cell and covers, for example, an office or a home. A group of such small cell base stations may together provide a wireless small cell network.

Such small cells have generally been provided where the communication coverage provided by the macro cell is poor, or where a user wishes to use an alternative communications link provided locally by the small cell base station, to communicate with the core network. Such a situation might arise where, for example, a user has a pre-existing communications link and the user wishes to utilise that link in preference to that provided by the macro cell network provider to communicate with the core network. However, increasingly, small cells are being deployed in areas of high traffic demand (often referred to as hot spots), where that demand risks overloading the macro cell. Users can then be handed over to the small cell in order to reduce the traffic load on the macro cell.

Although providing such small cells can provide many advantages, unexpected consequences can also occur.

Accordingly, it is desired to provide an improved technique for controlling the interaction between user equipment and base stations.

SUMMARY

According to a first aspect, there is provided a wireless telecommunications method, comprising: mapping at least some user plane traffic only from a first transmission path supporting communications between user equipment and a first base station to a second transmission path supporting simultaneous communications between the user equipment and a second base station; providing data protection configuration information used to encode the at least some user plane traffic transmitted over the second transmission path between the user equipment and the second base station; and transmitting the at least some user plane traffic encoded using the data protection configuration information over the second transmission path.

The first aspect recognises that a problem with offloading traffic from one base station to another base station is that a non-ideal backhaul link may exist between the base stations which means that it is not possible to gather the necessary information in time to enable scheduling decisions to be performed by a single base station due to the delay introduced by the non-ideal backhaul link. As a consequence, it is not possible to utilise a single scheduler, and so two schedulers are required, one for each of the transmission paths between the different base stations. Each of these transmissions paths carries traffic which needs to be protected by ciphering and integrity protection for that particular transmission path. However, the first aspect also recognises that current standards do not support protecting traffic differentially for different transmission paths associated with different network nodes at the same time.

Accordingly, a method is provided. The method may comprise the step of mapping traffic which only comprises user plane traffic from a first transmission path to a second transmission path. That is to say, at least a portion of the user plane traffic may be mapped from the first transmission path to the second transmission path. The first transmission path establishes communications between user equipment and a first base station, whilst the second transmission path supports communication between the user equipment and a second base station. The communication over the first and second transmission paths may occur simultaneously. That is to say, communication over the first transmission path may occur at the same time as communication over the second transmission path. The method may also comprise the step of providing data protection configuration information. The data protection configuration information may be used when encoding user plane traffic which is transmitted over the second transmission path. The data protection configuration information may comprise, for example, ciphering and integrity protection configuration information. The method may also comprise the step of transmitting the user plane traffic encoded with the data protection configuration over the second transmission path. In this way, at least some of the user plane traffic may be offloaded from a first transmission path to a second transmission path. That user plane traffic may be transmitted simultaneously with other user plane traffic. Accordingly, traffic can be directed to different network nodes at the same time and encoded using different data protection configuration information which allows separate schedulers to be used to enable simultaneous transmission to occur even with a non-ideal backhaul link between the two base stations.

In one embodiment, the method comprises the step of decoding user plane traffic encoded with the data protection configuration received over the second transmission path.

In one embodiment, the data protection configuration information is provided from the first base station to the user equipment. Accordingly, the data protection configuration information for the transmission path with the second base station may still be provided by the first base station to the user equipment.

In one embodiment, the data protection configuration information is provided to the first base station from the second base station. Accordingly, the first base station may receive the data protection information from the second base station.

In one embodiment, the data protection configuration information is provided in a transparent container to the first base station from the second base station for transmission to the user equipment. Accordingly, the second base station may provide the data protection configuration information to the first base station in a transparent container, which prevents the first base station from accessing or decoding the data protection configuration information. Instead, the first base station simply forwards that data protection configuration information on to the user equipment.

In one embodiment, the data protection configuration information is provided from the second base station to the user equipment. Accordingly, the second base station may provide the data protection configuration information to the user equipment.

In one embodiment, the data protection configuration information is provided to the second base station from the first base station. The data protection configuration information may be provided to the second base station from the first base station.

In one embodiment, the data protection configuration information is provided in a transparent container to the second base station from the first base station for transmission to the user equipment. Accordingly, the data protection configuration information may be provided to the second base station in a transparent container to prevent the second base station from decoding that information. The second base station may forward the transparent container to the user equipment for its use.

In one embodiment, the step of mapping comprises mapping all user plane traffic onto the second transmission path and the method comprises transmitting all the user plane traffic received by the second base station over an interface between the second base station and the first base station. Accordingly, all user plane traffic may be offloaded to the second transmission path. In one embodiment, all user plane traffic received by the second base station may be transmitted over an interface between the second base station and the first base station.

In one embodiment, the first transmission path is supported by a first protocol stack and the second transmission path is supported by a second protocol stack and the method comprises transmitting all the user plane traffic received by the second base station over an interface between the second base station and the first base station provided at a protocol stack layer below that protocol layer which applies the data protection configuration information. Accordingly, different protocol stacks may be provided and the user plane traffic received by the second base station may be provided to the first base station at a protocol stack layer which is below the protocol layer which applies the data protection configuration information. In other words, the user plane traffic offloaded onto the second base station may not be decoded by that second base station using the data protection configuration information, but may instead be passed to the first base station for such decoding.

In one embodiment, the method comprises the step of transmitting all the user plane traffic received by the second base station over an interface between the second base station and a core network. Accordingly, the second base station may communicate directly with the core network.

In one embodiment, the data protection configuration information comprises at least one encryption key used to encode the user plane traffic transmitted over the second transmission path.

In one embodiment, the first base station comprises a macro base station and the second base station comprises a small cell base station.

According to a second aspect, there is provided a computer program product operable, when executed on a computer, to perform the method steps of the first aspect.

According to a third aspect, there is provided user equipment, comprising: mapping logic operable to map at least some user plane traffic only from a first transmission path supporting communications between the user equipment and a first base station to a second transmission path supporting simultaneous communications between the user equipment and a second base station; reception logic operable to received provided data protection configuration information used to encode the user plane traffic transmitted over the second transmission path between the user equipment and the second base station; and transmission logic operable to transmit the at least some user plane traffic encoded using the data protection configuration information over the second transmission path.

In one embodiment, the user equipment comprises decoding logic operable to decode user plane traffic encoded with the data protection configuration received over the second transmission path.

In one embodiment, the data protection configuration information is provided from the first base station to the user equipment.

In one embodiment, the data protection configuration information is provided in a transparent container from the first base station.

In one embodiment, the data protection configuration information is provided from the second base station to the user equipment.

In one embodiment, the data protection configuration information is provided in a transparent container from the second base station.

In one embodiment, the mapping logic is operable to map all user plane traffic onto the second transmission path.

In one embodiment, the user equipment comprises a first protocol stack operable to support the first transmission path and a second first protocol stack operable to support the second transmission path.

In one embodiment, the data protection configuration information comprises at least one encryption key used to encode the user plane traffic transmitted over the second transmission path.

In one embodiment, the first base station comprises a macro base station and the second base station comprises a small cell base station.

According to a fourth aspect, there is provided a base station, comprising: mapping logic operable to determine at least some user plane traffic only to be mapped from a first transmission path supporting communications between user equipment and the base station to a second transmission path supporting communications between the user equipment and a second base station; transmission logic operable to provide data protection configuration information used to encode the user plane traffic transmitted over the second transmission path between the user equipment and the second base station.

In one embodiment, the base station comprises at least one of decoding logic operable to decode user plane traffic encoded with the data protection configuration received over the second transmission path and encoding logic operable to encode user plane traffic encoded with the data protection configuration transmitted over the second transmission path.

In one embodiment, the data protection configuration information is provided from the base station to the user equipment.

In one embodiment, the data protection configuration information is provided to the base station from the second base station.

In one embodiment, the data protection configuration information is provided in a transparent container to the first base station from the second base station for transmission to the user equipment.

In one embodiment, the data protection configuration information is provided from the second base station to the user equipment.

In one embodiment, the data protection configuration information is provided to the second base station from the first base station.

In one embodiment, the data protection configuration information is provided in a transparent container to the second base station from the first base station for transmission to the user equipment.

In one embodiment, the mapping logic is operable to determine that all user plane traffic is to be mapped onto the second transmission path and the base station comprises reception logic operable to receive all the user plane traffic received by the second base station over an interface with the second base station.

In one embodiment, the first transmission path is supported by a first protocol stack and the second transmission path is supported by a second protocol stack and the method comprises reception logic operable to receive all the user plane traffic received by the second base station over an interface with the second base station provided at a protocol stack layer below that protocol layer which applies the data protection configuration information.

In one embodiment, the data protection configuration information comprises at least one encryption key used to encode the user plane traffic transmitted over the second transmission path.

In one embodiment, the base station comprises a macro base station and the second base station comprises a small cell base station.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Overview

Figure 1:
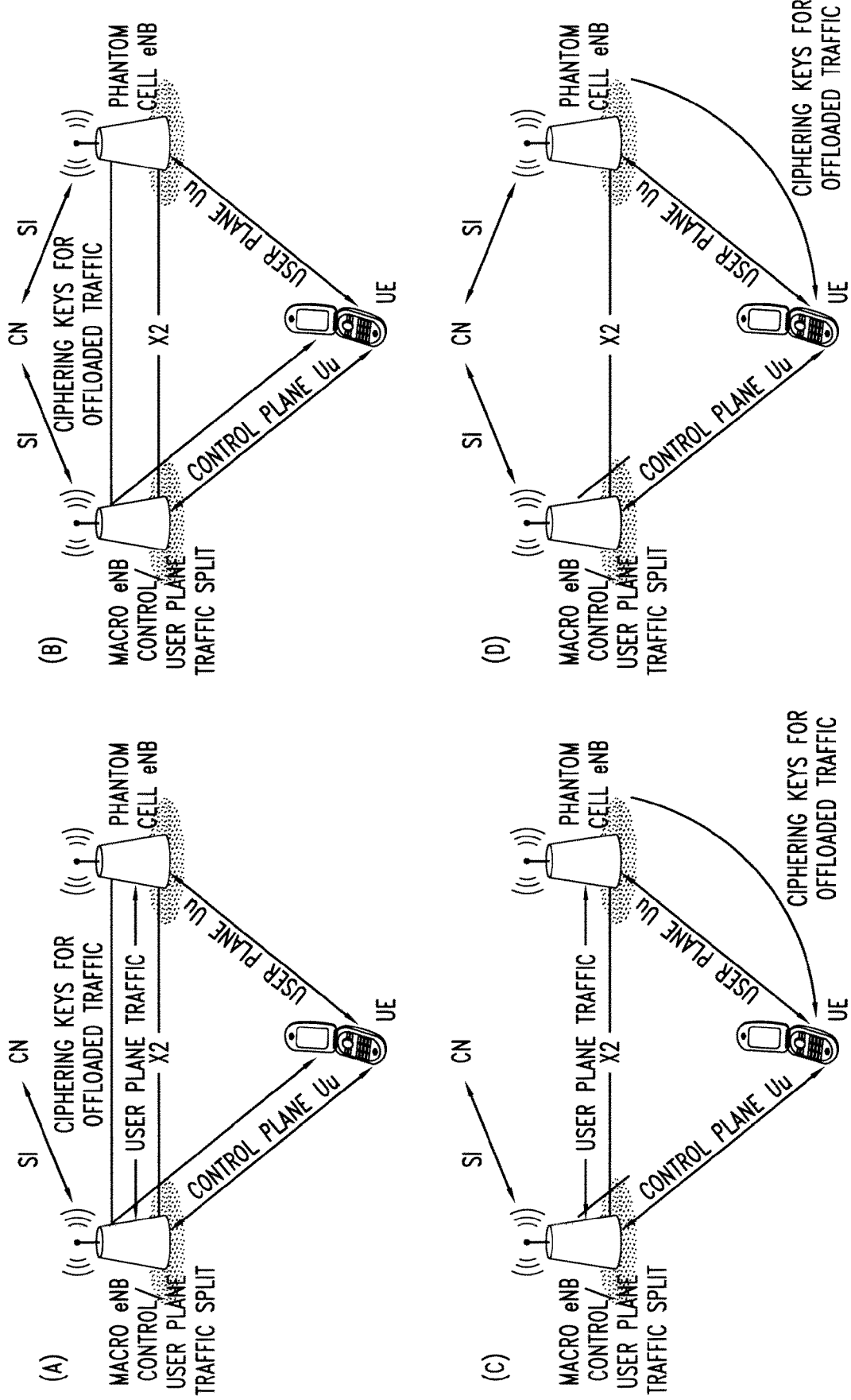
FIGS. 1A to 1D illustrate different techniques for providing security information relating to the transmission path for transmissions between the phantom cell and the user equipment.

Before discussing the embodiments in any more detail, first an overview will be provided. As mentioned above, the utilisation of small cells for traffic offloading in high capacity areas is a useful facility for network operators. Small cells deployed for this purpose are often referred to as phantom cells. However, it is often the case that the backhaul link from the phantom cell has inadequate performance and is not ideal for the delivery of data traffic onwards to the serving base station or to the core network. Having a non-ideal backhaul link results in the need for separate schedulers in the macro and femto base stations. This is because gathering and forwarding the necessary information in time for scheduling decisions at a single node is not possible due to the delay introduced by the non-ideal backhaul link. Also, it is possible that user equipment may deliver traffic to a phantom cell and that phantom cell could forward the traffic to the core network, such as, for example, a serving gateway using, for example, an S1-U interface. In this arrangement, it is not necessary for the traffic to then be routed via the serving macro cell.

Each transmission path or communication link is protected by ciphering and integrity protection over the radio in order to enable reliable communication. When traffic is offloaded to the phantom cell, the transmission path or radio link between the user equipment and the phantom cell is required to be protected. Embodiments provide an arrangement for protecting the offloading traffic communicated over the transmission path, which may be uplink and/or downlink with the phantom cell and a security architecture which provides differential data protection for data communication with the macro base station and the phantom base station at the same time.

In the current Long Term Evolution (LTE) standards, user equipment communication is between two logical nodes as far as the radio interface is considered. Therefore, those standards envisage that all traffic is protected using the same ciphering and integrity protection keys derived for the corresponding radio link (for example, between the user equipment and the serving base station). No mechanism exists currently for protecting traffic communicated with the user equipment differentially for communication with different network nodes at the same time.

Accordingly, embodiments provide a technique which enables the user equipment to derive the ciphering and integrity protection associated with a data flow based on the transmission path for that data flow and enables the corresponding protection to be applied to that data flow. Ciphering and de-ciphering is performed by the user equipment for the uplink and/or downlink traffic. The relevant information for deriving the security keys for each transmission path is communicated to the user equipment from the network. This enables user plane traffic to be offloaded to a second base station and the appropriate data protection configuration information required to perform the correct encoding of that traffic for that transmission path to be applied. This enables the simultaneous transmission of traffic with two or more different base stations.

Security Information Provisioning

FIGS. 1A to 1D illustrate different techniques for providing security information relating to the transmission path for transmissions between the phantom cell and the user equipment.

In FIG. 1A, it is intended that a control plane is maintained with the macro base station and some or all of the user plane traffic is offloaded via the phantom cell. The user plane traffic is also routed via the macro base station for communication with the core network.

The arrangement in FIG. 1B is similar to that of FIG. 1A, but in this arrangement the user plane traffic transmitted via the phantom base station is communicated directly back to the core network via the phantom base station's interface with the core network.

In both of the arrangements shown in FIGS. 1A and 1B the security information for the transmissions between the user equipment and the phantom cell are transmitted to the user equipment from the serving macro base station. Typically, the security information is provided in a transparent container transmitted from the phantom base station to the macro base station for onward transmission to the user equipment. Typically, the macro base station is unable to decode the security information within the transparent container and simply forwards this information to the user equipment. Such communication between the phantom base station and macro base station will typically take place during the traffic offloading negotiation between the serving macro base station and the phantom base station, as will be described in more detail below.

FIGS. 1C and 1D show a similar arrangement to that of FIGS. 1A and 1B, respectively. However, in this arrangement the security information is provided to the user equipment from the phantom base station after the user equipment access to the phantom cell has been established. However, with this approach, a control plane with both the serving macro base station and the phantom base station will typically be established. Therefore, pure separation of the control and user plane traffic is typically not possible with this approach.

Providing the security information enables a base station to correctly encode downlink traffic and the user equipment to correctly decode that downlink traffic and/or the user equipment to correctly encode uplink traffic and the base station to correctly decode that uplink traffic.

Macro Base Station Supply of Security Information

Figure 2:
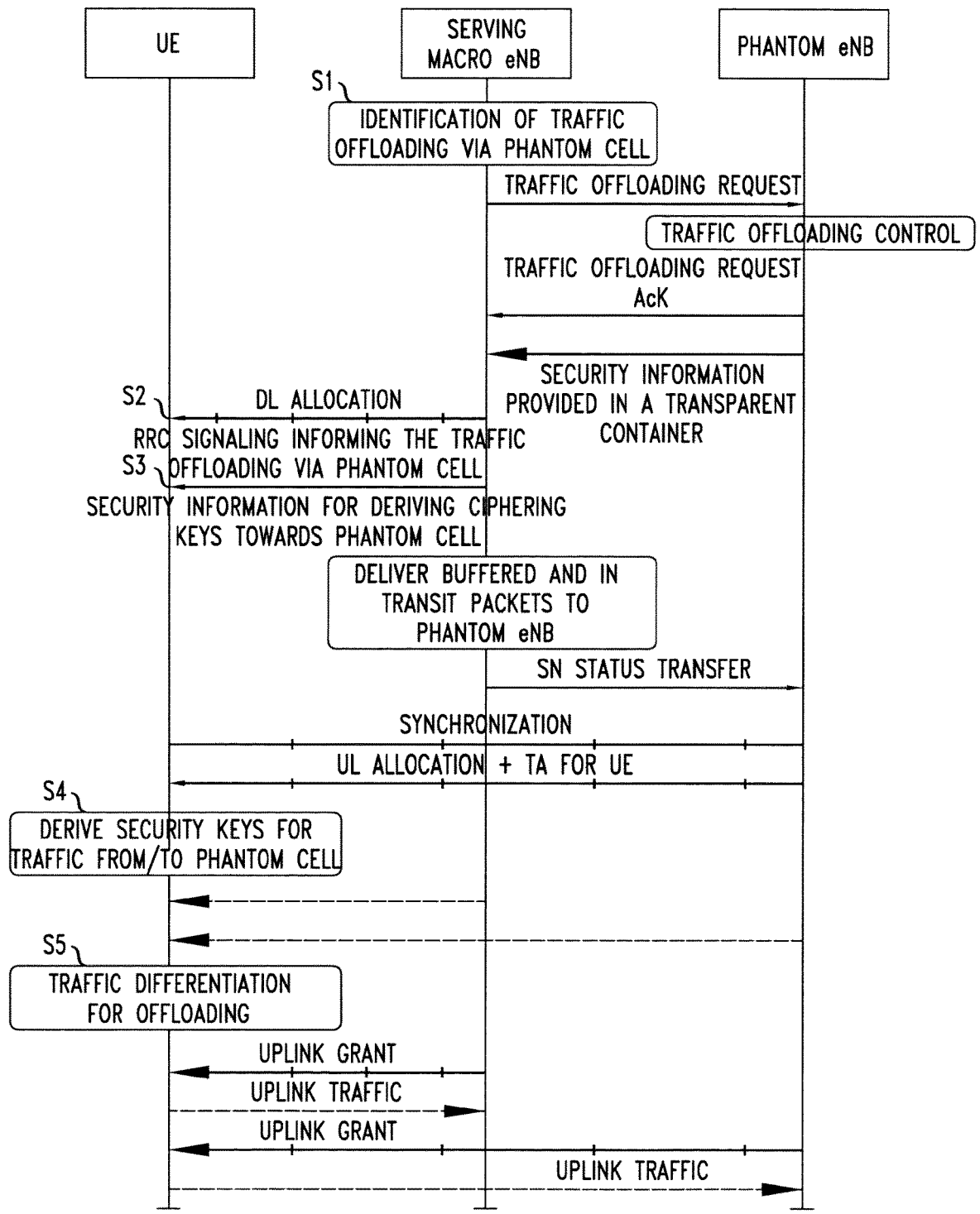
FIG. 2 illustrates example signalling between network nodes for the arrangement shown in FIGS. 1A and 1B.

FIG. 2 illustrates example signalling between network nodes for the arrangement shown in FIGS. 1A and 1B.

At step S1, it is identified that traffic offloading via the phantom base station is possible. This may come from measurement reports provided from the user equipment or from information provided by the phantom base station itself. Thereafter, a traffic offloading request is made to the phantom base station which considers whether it is possible for the phantom base station to cope with the additional traffic. Assuming it is, then a traffic offloading request acknowledgement is transmitted back to the serving macro base station.

At step S2, security information is provided in a transparent container from the phantom base station to the serving macro base station typically over the X2 interface. Thereafter, downlink allocation occurs and Radio Resource Connection (RRC) signalling informs the user equipment of which traffic to offload via the phantom base station. Typically, as part of this RRC signalling, security information is provided from the macro base station to the user equipment for use when encoding or decoding the offloaded traffic for transmission (either downlink or uplink) over the transmission path between the user equipment and the phantom base station.

Downlink traffic is forwarded to the phantom base station together with a sequence number status transfer. Thereafter, synchronisation occurs, together with the uplink allocation and the timing advance for the user equipment.

At step S4, the user equipment then derives the security keys from the security information and receives data traffic from both the serving base station and the phantom base station. The user equipment then differentiates the offloaded traffic from the non-offloaded traffic and applies the appropriate security keys when decoding that traffic, which has been encoded using the appropriate security keys. Accordingly, uplink traffic with the serving macro base station is transmitted to the serving base station using the security keys designated for communication over the transmission path with that serving base station, whereas the offloaded traffic designated for transmission via the femto base station is encoded using the security keys designated for the transmission path between the user equipment and the phantom base station. The base stations decode the traffic using also using the appropriate security keys.

Phantom Base Station Supply of Security Information

Figure 3:
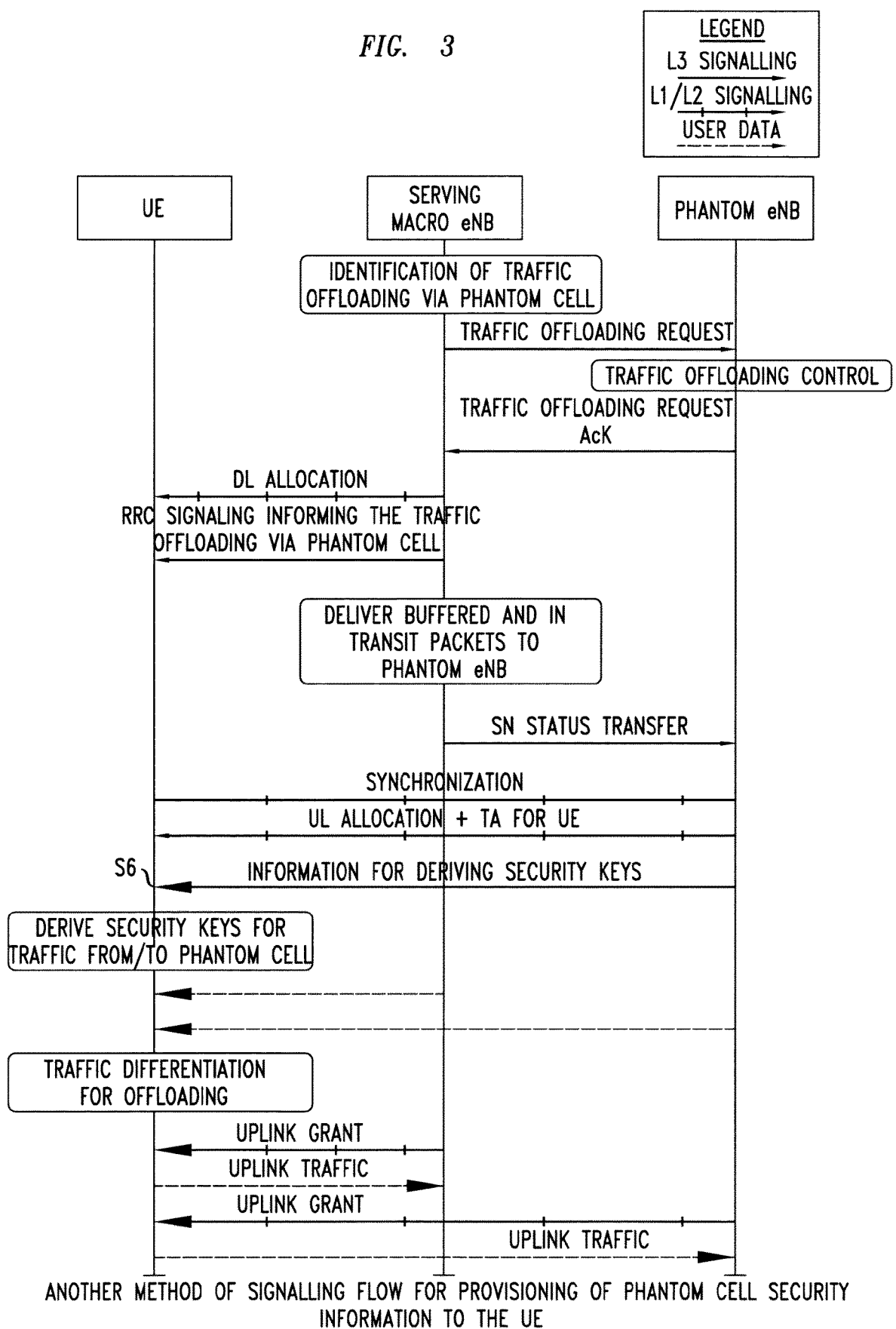
FIG. 3 illustrates the signalling between network nodes for the arrangements shown in FIGS. 1C and 1D.

FIG. 3 illustrates the signalling between network nodes for the arrangements shown in FIGS. 1C and 1D. As can be seen, the signalling is similar to that mentioned in FIG. 2 above, but instead, at step S6, the information for deriving security keys is transmitted directly from the phantom base station to the user equipment.

Downlink Decoding

Figure 4:
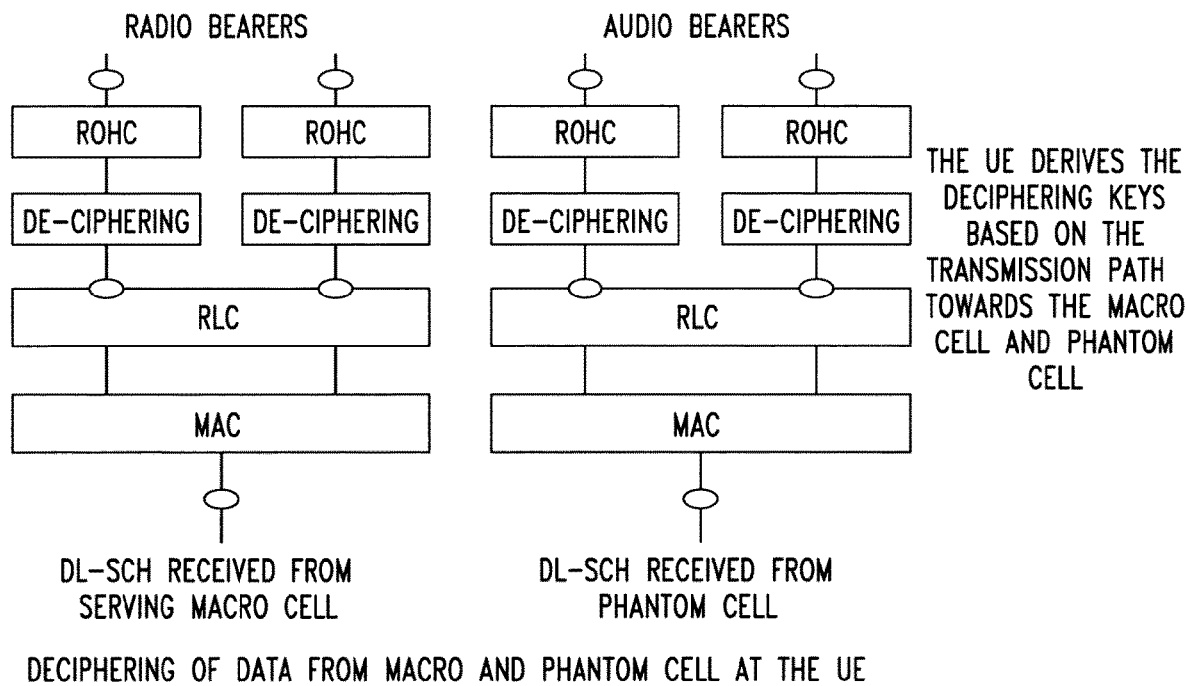
FIG. 4 illustrates the operation of the user equipment when deciphering downlink traffic received from the macro cell and the phantom cell.

FIG. 4 illustrates the operation of the user equipment when deciphering downlink traffic received from the macro cell and the phantom cell on, for example, the Downlink Shared Channel (DL-SCH). The user equipment derives the deciphering keys for the transmissions from the phantom cell based on the security information received from the network mentioned above. As can be seen, the user equipment will typically maintain two sets of security keys, one for the transmissions from the macro cell and one for transmissions from the femto cell. The base stations will encode the downlink traffic using the appropriate security information.

Uplink Decoding

A similar arrangement exists in uplink where the user equipment separates the traffic towards the phantom cell from that of the macro cell, typically at the radio bearer level. The traffic towards the phantom base station is ciphered with the security keys derived for the phantom base station. Similarly, radio bearers transmitted towards the macro base station are ciphered with security keys corresponding to the macro base station. The base stations will decode the uplink traffic using the appropriate security information.

Shared Key Offloading

Figure 5:
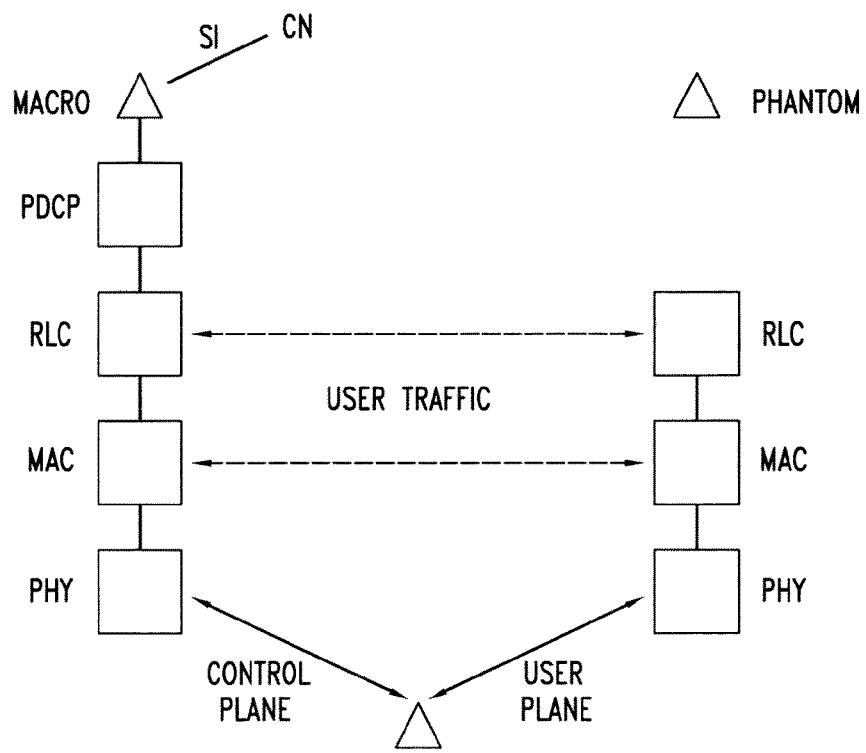
FIG. 5 illustrates an arrangement where transmissions to both the macro base station and the femto base station occur using a shared key.

FIG. 5 illustrates an arrangement where transmissions to both the macro base station and the femto base station occur using keys for their respective transmission paths, but in this case the two transmission paths share the same key. This is possible because the transfer of traffic between the macro base station and the femto base station occurs at a protocol level below that of the packet data convergence protocol layer. This is only possible for the arrangements shown in FIGS. 1A and 1C above, where all traffic is routed via the macro base station for communication with the core network. In this arrangement, the security information applied will typically be provided by the macro base station to the femto base station in a transparent container for transmission to the user equipment.

As can be seen in all the examples shown, typically some or all of the user plane traffic is offloaded via the phantom base station.

Accordingly, it can be seen that embodiments provide an arrangement for the protection of data flows towards different network nodes for simultaneous transmission. Control and user plane traffic can therefore be delivered via different transmission paths, which is a useful function to provide to network operators.

Embodiments provide two features to enable ciphering of data streams that are transmitted between user equipment and a plurality of network nodes. Embodiments assume that:

ciphering and deciphering should be performed independently per PDCP context; and in the case of the backhaul connections to the network nodes having non-negligible latency, there should be a separate PDCP context in each node that is communicating with the UE.

Existing solutions for multipoint transmission/reception (CoMP), whereby there is a single PDCP context in one of the nodes, and hence a single set of cipher keys, with the data split being at the MAC level, is not applicable to the scenario for which the embodiments are intended (and furthermore in embodiments there might be separate connections to the core network from each base station).

Hence the two key features proposed in one aspect are:
1. a user equipment can be configured with more than one set of cipher keys for different data streams that are communicated by different network nodes; and
2. the cipher keys corresponding to communication with one network node may be provided to the user equipment via another network node; this takes place via a transparent container such that the network node via which the keys are provided to the user equipment is not able to access the keys from the originating network node.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as 3o being without limitation to such specifically recited examples and conditions. Moreover, all statements herein reciting principles, aspects, and embodiments of the invention, as well as specific examples thereof, are intended to encompass equivalents thereof.

The invention claimed is:

1. A method, comprising:
supporting simultaneous communication by a user equipment over a first wireless communication path with a first base station and a second wireless communication path with a second base station; and
applying a first security key for traffic over the first wireless communication path and a second security key for traffic over the second wireless communication path, the first security key being different from the second security key, wherein applying the second security key for traffic over the second wireless communication path comprises:
receiving security information from the first base station over the first wireless communication path;
deriving the second security key using the security information; and
encoding the traffic for transmission over the second wireless communication path using the second security key.

2. The method of claim 1, wherein the first security key and the second security key are ciphering keys.

3. The method of claim 1, wherein the first security key is applied using a first packet data convergence protocol, PDCP, context, and wherein the second security key is applied using a second PDCP context, the second PDCP context being different from the first PDCP context.

4. An apparatus comprising:
at least one processor; and
at least one memory including computer program code;
the at least one memory and the computer program code configured to, with the at least one processor, cause the apparatus at least to perform:
simultaneously receiving traffic from a first base station via a first wireless communication path and from a second base station via a second wireless communication path;
simultaneously transmitting traffic to the first base station via the first wireless communication path and to the second base station via the second wireless communication path;
applying a first security key for traffic for transmission over the first wireless communication path and a second security key for traffic for transmission over the second wireless communication path, the first security key being different from the second security key; and applying the first security key for traffic received over the first wireless communication path and the second security key for traffic received over the second wireless communication path.

5. The apparatus of claim 4, wherein the at least one memory and the computer program code are configured to, with the at least one processor, cause the apparatus at least to perform: receiving security information from the first base station over the first wireless communication path;
deriving the second security key using the security information; and
encoding the traffic for transmission over the second wireless communication path using the second security key.

6. The apparatus of claim 4, wherein the at least one memory and the computer program code are configured to, with the at least one processor, cause the apparatus at least to perform:
receiving security information from the first base station over the first wireless communication path, and wherein the decoding logic is further operable to:
deriving the second security key using the security information; and
decoding the traffic received over the second wireless communication path using the second security key.

7. The apparatus of claim 4, wherein the first security key and the second security key are ciphering keys.

8. The apparatus of claim 4, wherein the at least one memory and the computer program code are configured to, with the at least one processor, cause the apparatus at least to perform applying the first security key using a first packet data convergence protocol, PDCP, context and to apply the second security key using a second PDCP context, the second PDCP context being different from the first PDCP context.

9. A method, comprising:
supporting simultaneous communication by a user equipment over a first wireless communication path with a first base station and a second wireless communication path with a second base station; and
applying a first security key for traffic over the first wireless communication path and a second security key for traffic over the second wireless communication path, the first security key being different from the second security key, wherein applying the second security key for traffic over the second wireless communication path comprises:
receiving security information from the first base station over the first wireless communication path;
deriving the second security key using the security information; and
decoding the traffic received over the second wireless communication path using the second security key.

10. An apparatus comprising:
at least one processor; and
at least one memory including computer program code;
the at least one memory and the computer program code configured to, with the at least one processor, cause the apparatus at least to perform:
supporting simultaneous communication by a user equipment over a first wireless communication path with a first base station and a second wireless communication path with a second base station; and
applying a first security key for traffic over the first wireless communication path and a second security key for traffic over the second wireless communication path, the first security key being different from the second security key, wherein applying the second security key for traffic over the second wireless communication path comprises:
receiving security information from the first base station over the first wireless communication path;
deriving the second security key using the security information; and
encoding the traffic for transmission over the second wireless communication path using the second security key.

11. An apparatus comprising:
at least one processor; and
at least one memory including computer program code;
the at least one memory and the computer program code configured to, with the at least one processor, cause the apparatus at least to perform:
supporting simultaneous communication by a user equipment over a first wireless communication path with a first base station and a second wireless communication path with a second base station; and
applying a first security key for traffic over the first wireless communication path and a second security key for traffic over the second wireless communication path, the first security key being different from the second security key, wherein applying the second security key for traffic over the second wireless communication path comprises:
receiving security information from the first base station over the first wireless communication path;
deriving the second security key using the security information; and
decoding the traffic received over the second wireless communication path using the second security key.

* * * * *